United States Patent
Mueller et al.

(10) Patent No.: US 9,788,397 B2
(45) Date of Patent: Oct. 10, 2017

(54) LIGHTING COMMUNICATION ADVERTISING PACKETS

(71) Applicant: Xicato, Inc., San Jose, CA (US)

(72) Inventors: Martin Emil Mueller, Fremont, CA (US); Barry Mark Loveridge, San Jose, CA (US); Jeffrey P. Hushley, Kailua, HI (US); Gerard Harbers, Sunnyvale, CA (US)

(73) Assignee: Xicato, Inc., San Jose, CA (US)

( * ) Notice: Subject to any disclaimer, the term of this patent is extended or adjusted under 35 U.S.C. 154(b) by 0 days.

(21) Appl. No.: 15/055,358

(22) Filed: Feb. 26, 2016

(65) Prior Publication Data

US 2016/0255704 A1    Sep. 1, 2016

Related U.S. Application Data

(60) Provisional application No. 62/126,341, filed on Feb. 27, 2015, provisional application No. 62/236,055, filed on Oct. 1, 2015.

(51) Int. Cl.
*H05B 37/02* (2006.01)
*H05B 33/08* (2006.01)
(Continued)

(52) U.S. Cl.
CPC ......... *H05B 37/0272* (2013.01); *G08C 17/02* (2013.01); *H04W 80/02* (2013.01);
(Continued)

(58) Field of Classification Search
None
See application file for complete search history.

(56) References Cited

U.S. PATENT DOCUMENTS 5,959,316 A    9/1999   Lowery
6,351,069 B1   2/2002   Lowery et al.
(Continued)

FOREIGN PATENT DOCUMENTS

EP    2401895 A1    1/2012
EP    2739020 A2    6/2014
(Continued)

OTHER PUBLICATIONS

Invitation to Pay Additional Fees dated Jun. 1, 2016 for International Application No. PCT/US2016/20050 filed on Feb. 29, 2016 by Xicato, Inc., 9 pages.
(Continued)

*Primary Examiner* — Jany Richardson
(74) *Attorney, Agent, or Firm* — Silicon Valley Patent Group LLP

(57) ABSTRACT

A Light Emitting Diode (LED) based illumination device may include a Light Control and Data Interface Module (LCDIM). The LCDIM may include an LED driver that supplies electrical power to the LED based light engine of the LED based illumination module. The LCDIM may include a radio frequency (RF) transmitter that communicates a signal indicative of an operational status of the LED based light engine to another device on a wireless communications network using a Bluetooth Low Energy (BLE) advertising packet. Additionally, in a lighting control system, a light control device may include a RF transmitter to communicate a signal indicative of a lighting control command to the LCDIM using a BLE advertising packet.

18 Claims, 11 Drawing Sheets

(51) Int. Cl.
*H04W 80/02* (2009.01)
*H04W 84/18* (2009.01)
*G08C 17/02* (2006.01)
*H05B 37/03* (2006.01)

(52) U.S. Cl.
CPC ........ *H04W 84/18* (2013.01); *H05B 33/0803* (2013.01); *H05B 33/0872* (2013.01); *H05B 33/0893* (2013.01); *H05B 37/034* (2013.01); *H04M 2250/02* (2013.01)

(56) References Cited

U.S. PATENT DOCUMENTS

| | | | |
|---|---|---|---|
| 6,504,301 | B1 | 1/2003 | Lowery |
| 6,586,882 | B1 | 7/2003 | Harbers |
| 6,600,175 | B1 | 7/2003 | Baretz et al. |
| 6,680,569 | B2 | 1/2004 | Mueller-Mach et al. |
| 6,812,500 | B2 | 11/2004 | Reeh et al. |
| 7,126,162 | B2 | 10/2006 | Reeh et al. |
| 7,250,715 | B2 | 7/2007 | Mueller et al. |
| 7,479,662 | B2 | 1/2009 | Soules et al. |
| 7,564,180 | B2 | 7/2009 | Brandes |
| 7,614,759 | B2 | 11/2009 | Negley |
| 7,629,621 | B2 | 12/2009 | Reeh et al. |
| 2007/0081336 | A1 | 4/2007 | Bierhuizen et al. |
| 2008/0143273 | A1* | 6/2008 | Davidson ........... H05B 37/0272 315/294 |
| 2013/0165044 | A1 | 6/2013 | Xie et al. |
| 2015/0147067 | A1* | 5/2015 | Ryan .................... H04B 10/116 398/118 |
| 2016/0255698 | A1 | 9/2016 | Harbers et al. |

FOREIGN PATENT DOCUMENTS

| | | |
|---|---|---|
| JP | 2001093675 A | 4/2001 |
| WO | WO2010097742 A1 | 9/2010 |
| WO | WO2011053132 A2 | 5/2011 |

OTHER PUBLICATIONS

Machine translation in English of Abstract for JP2001093675 visited at www.espacenet.com on Jul. 30, 2016, 2 pages.
International Search Report and Written Opinion dated May 25, 2016 for International Application No. PCT/US2016/020052 filed on Feb. 29, 2016 by Xicato, Inc., 14 pages.
U.S. Appl. No. 15/055,298, filed Feb. 26, 2016 by Xicato, Inc., 30 pages.
International Search Report and Written Opinion dated Aug. 16, 2016 for International Application No. PCT/US2016/20050 filed on Feb. 29, 2016 by Xicato, Inc., 17 pages.
Restriction Requirement dated May 5, 2017 for U.S. Appl. No. 15/055,298.

* cited by examiner

142

| # | |
|---|---|
| 0 | AD Flags |
| 1 | |
| 2 | |
| 3 | Field Length <0x1B> |
| 4 | Field Header <0xFF> |
| 5 | Xicato Company ID |
| 6 | 0x0253 |
| 7 | Device/Packet Type |
| 8 | |
| 9 | Device ID |
| 10 | |
| 11 | |
| 12 | |
| 13 | Sequence ID |
| 14 | RFU |
| 15 | Module Intensity |
| 16 | |
| 17 | Module Status |
| 18 | Module Power |
| 19 | Status/Power Extension |
| 20 | LED Temperature |
| 21 | PCB Temperature |
| 22 | Input Voltage |
| 23 | Input Voltage Ripple |
| 24 | Voltage Extension |
| 25 | RFU |
| 26 | |
| 27 | |
| 28 | |
| 29 | |
| 30 | Data Protection |

FIG. 3A

| # | |
|---|---|
| 0 | AD Flags |
| 1 | |
| 2 | |
| 3 | Field Length <0x1B> |
| 4 | Field Header <0xFF> |
| 5 | Xicato Company ID 0x0253 |
| 6 | |
| 7 | Device/Packet Type |
| 8 | |
| 9 | Device ID |
| 10 | |
| 11 | |
| 12 | |
| 13 | Sequence ID |
| 14 | RFU |
| 15 | Module Intensity |
| 16 | |
| 17 | Module Status |
| 18 | Product ID (GTIN) |
| 19 | |
| 20 | |
| 21 | Operating Hours |
| 22 | |
| 23 | Power Cycles |
| 24 | |
| 25 | LED Cycles |
| 26 | |
| 27 | Operations Extension |
| 28 | RFU |
| 29 | |
| 30 | Data Protection |

LIGHTING COMMUNICATION ADVERTISING PACKETS

CROSS REFERENCE TO RELATED APPLICATIONS

This application claims priority under 35 USC 119 to U.S. Provisional Application No. 62/126,341, filed Feb. 27, 2015, and to U.S. Provisional Application No. 62/236,055, filed Oct. 1, 2015, both of which are incorporated by reference herein in their entireties.

TECHNICAL FIELD

The described embodiments relate to illumination modules that include Light Emitting Diodes (LEDs).

BACKGROUND

The use of LEDs in general lighting is becoming more desirable and prevalent. Typically, LED illumination devices are standalone units. It is desirable, however, to be able to communicate between devices and with external devices.

SUMMARY

A Light Emitting Diode (LED) based illumination device may include a Light Control and Data Interface Module (LCDIM). The LCDIM may include an LED driver that supplies electrical power to the LED based light engine of the LED based illumination module. The LCDIM may include a radio frequency (RF) transmitter that communicates a signal indicative of an operational status of the LED based light engine to another device on a wireless communications network using an advertising packet, e.g., a Bluetooth Low Energy (BLE) advertising packet. Additionally, in a lighting control system, a light control device may include a RF transmitter to communicate a signal indicative of a lighting control command to the LCDIM using an advertising packet, e.g., a BLE advertising packet.

In one implementation, a Light Control and Data Interface Module (LCDIM) includes an LED driver configured to supply electrical power to an LED based light engine that is electrically coupled to the LCDIM; and a radio frequency transmitter configured to communicate a signal indicative of an operational status of the LED based light engine to another device communicatively linked to the LCDIM on a wireless communications network operating in compliance with the Bluetooth Low Energy (BLE) protocol, wherein the communicating of the signal involves a BLE advertising packet that includes the signal indicative of the operational status of the LED based light engine.

In one implementation, a lighting control system includes a Light Control and Data Interface Module (LCDIM) comprising an LED driver configured to supply electrical power to an LED based light engine that is electrically coupled to the LCDIM; and a light control device comprising a radio frequency transmitter configured to communicate a signal indicative of a lighting control command to the LCDIM, wherein the light control device and the LCDIM are communicatively linked on a wireless communications network operating in compliance with the Bluetooth Low Energy (BLE) protocol, wherein the communicating of the signal involves a BLE advertising packet that includes the signal indicative of the lighting control command.

BRIEF DESCRIPTION OF THE DRAWINGS

FIG. 3A depicts an example of an advertising packet including data on dynamically changing operating conditions that may be broadcast by the LED based illumination device.

FIG. 3B depicts another example of an advertising packet including data on slowly changing operating conditions that may be broadcast by the LED based illumination device.

DETAILED DESCRIPTION

Reference will now be made in detail to background examples and some embodiments of the invention, examples of which are illustrated in the accompanying drawings.

Figure 1:
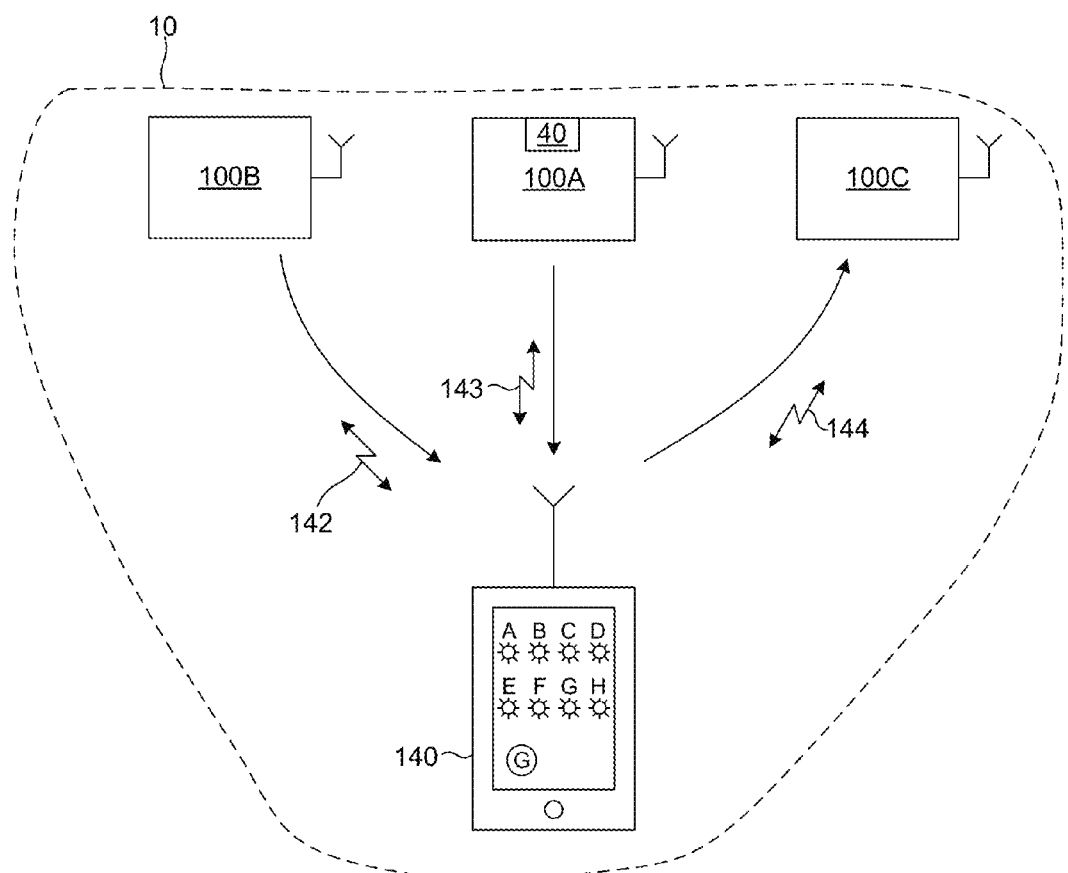
FIG. 1 depicts a lighting control and information system including a lighting control network.

FIG. 1 depicts a lighting control and information system including a lighting control network 10 in an exemplary, non-limiting embodiment. Lighting control network 10 is configured as a wireless network (e.g., Bluetooth Low Energy, etc.) that includes LED based illumination devices 100A-C and a lighting control device such as a mobile electronic device 140 (e.g., mobile phone, tablet computer, etc.).

Figure 2:
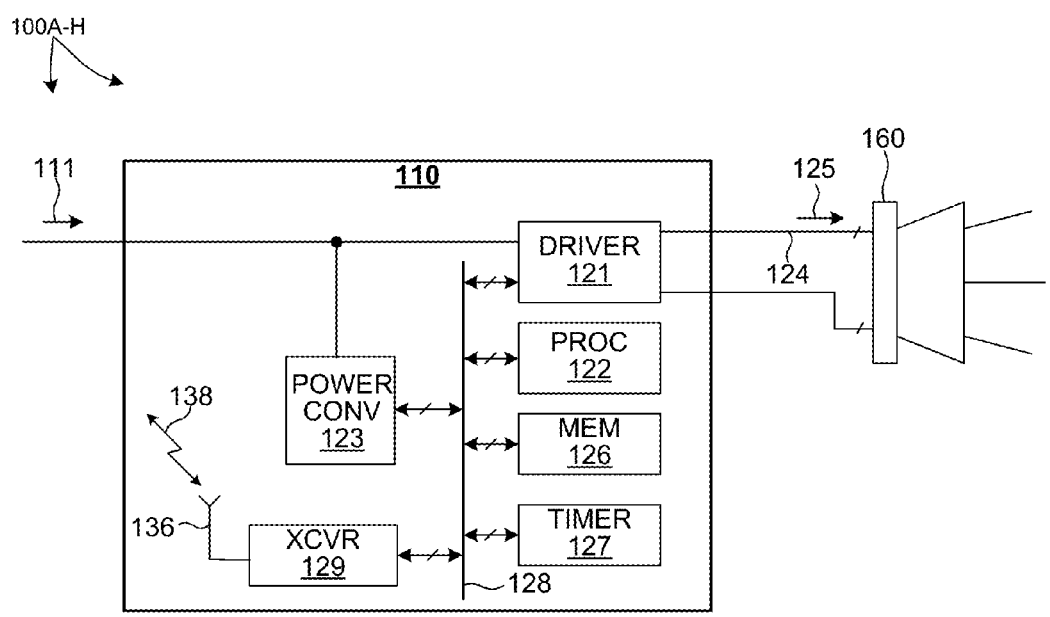
FIG. 2 depicts an exemplary LED based illumination device that includes a Light Control and Data Interface Module (LCDIM) configured to supply electrical power to an LED based light engine.
Figure 4:
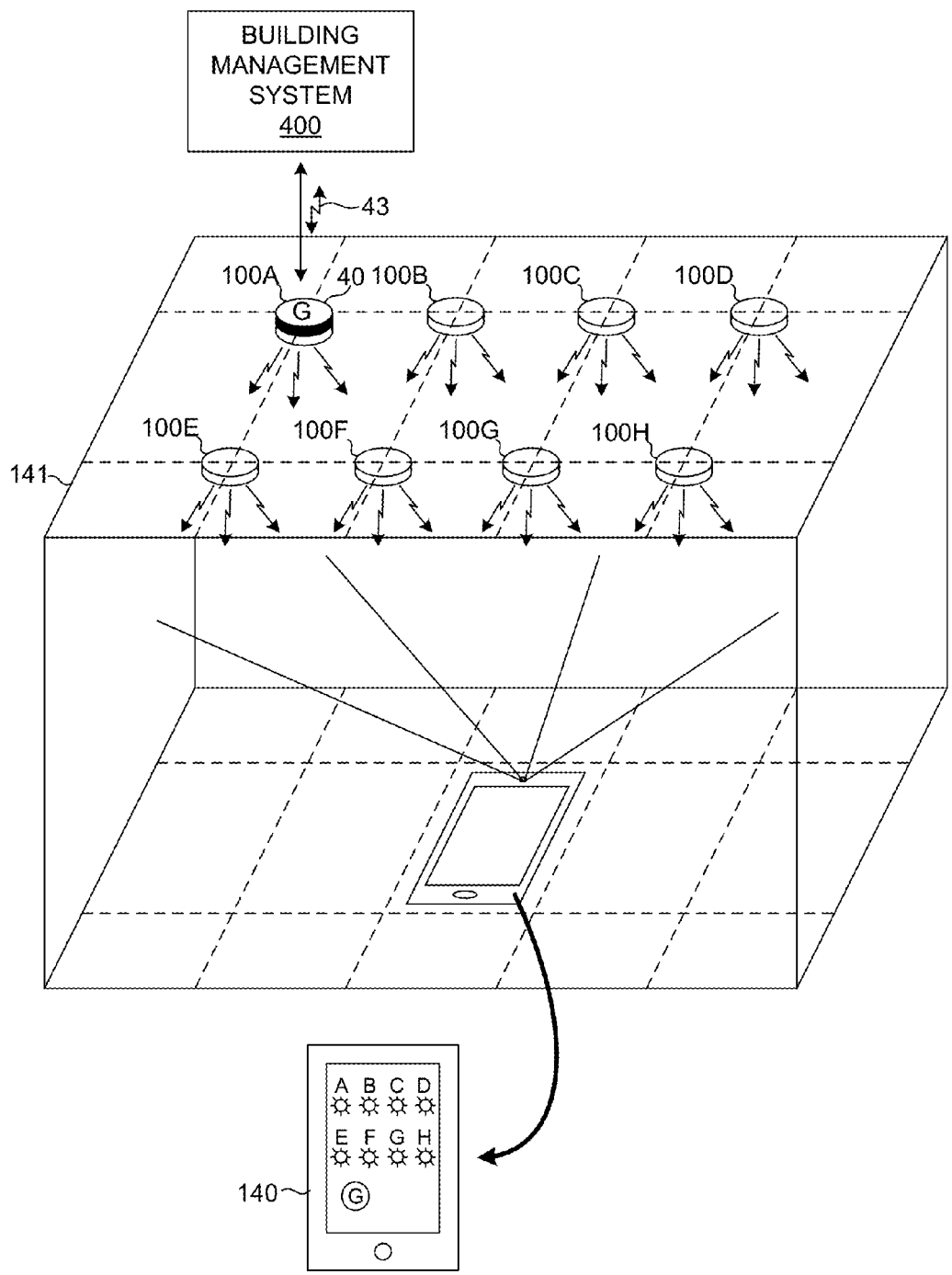
FIG. 4 depicts an environment illuminated by a plurality of LED based illumination device

FIG. 2 depicts an exemplary LED based illumination device such as any of LED based illumination devices 100A-C depicted in FIG. 1 and LED based illumination devices 100A-H depicted in FIG. 4. LED based illumination device 100A-H includes a Light Control and Data Interface Module (LCDIM) 110 configured to supply electrical power to an LED based light engine 160. In addition, LCDIM 110 also integrates light control, power conversion, data acquisition, data processing, and communication capability. LCDIM 110 includes a radio frequency transmitter, e.g., in radio frequency transceiver 129, configured to communicate signals 138 with other devices on the lighting control network 10. LCDIM 110 may further include a receiver, e.g., in radio frequency transceiver 129 configured to receive signals from other devices on the lighting control network 10.

In some embodiments, the wireless communications protocol associated with the lighting control network 10 is based on the BLE standard. Such a network is localized and is compatible with many mobile electronic devices 140. A number of lighting control and data collection functions such as commissioning, configuration of groups, control parameter selection, indoor location services, etc., are coordinated by mobile electronics device 140 on the lighting control network 10.

In one aspect, a novel Bluetooth Low Energy (BLE) advertising packet structure is employed to communicate lighting control and status information signals across lighting control network 10.

The inventors have discovered that in some situations BLE advertising is a more suitable medium for communication of light control and status information than BLE connections. A BLE connection can only be made to a target after a BLE advertising packet from the target has been received. Thus, lighting control at sufficiently high response rates can only be achieved with a very high advertising rate in the target device, or perhaps not at all due to overhead associated with establishing BLE connections. This leads to advertising channel congestion and resulting packet loss. By employing BLE advertising packets to communicate lighting control and status information directly, the advertising rate for each device to communicate status information may be reduced dramatically (e.g., advertising intervals greater than two seconds). Yet, command response is nearly instantaneous since the target is continuously scanning for advertised commands. In this manner, advertising channel congestion is reduced while maintaining command responsiveness.

A BLE advertising message is an unacknowledged, broadcast message generally communicated to all devices in the surrounding environment. Typically, BLE advertising messages are communicated periodically at a consistent interval, e.g., every second, every three seconds, etc. In a further aspect, communication of light control and status information via BLE advertising packets is performed aperiodically. In some examples, the communication of light control and status information is communicated on an event-driven basis, rather than time. In one example, a sensor of lighting control network 10 detects a change of state in the surrounding environment. This event triggers the sensor to begin transmitting one or more BLE advertising packets, each communicating an indication of the change of state. These BLE advertising packets may be sent out several times at a fixed interval, but advertisement of the event is eventually stopped. In some embodiments, an event triggers a sensor to begin transmitting one or more BLE advertising packets. In some embodiments, one or more LED based illumination devices receive the BLE advertising packets indicative of a change of state detected by one or more sensors. The LED based illumination device responds to the change of state in accordance with lighting control rules stored in a memory of the LED based illumination device. In some embodiments, LED based illumination device broadcasts a message indicating that the LED based illumination device has responded to the change of state. Meanwhile, the sensor may listen for a message from one or more surrounding LED based illumination devices, indicating that the LED based illumination device has responded in the desired manner. Upon receipt of this message, the sensor stops sending out BLE advertising packets.

This approach is useful for sensors that must operate with low power consumption, e.g., energy harvesting sensors. Rather than sending out packets on a periodic basis, packets are only sent out on an event-driven basis. This reduces power consumption, and improves system responsiveness as the BLE advertising packets are immediately sent out when warranted, rather than awaiting a periodic interval.

In some embodiments, one or more sensors are employed as a light control device. Sensors can be BLE enabled user operated switches, motion sensors, optical tripwires, accelerometers, and proximity sensors. In some embodiments, a mobile communications device, such as smartphone, tablet computer, etc., may be employed as a light control device. In some embodiments, gateway devices that may communicate with other systems through the internet may be used. For example, a utility demand response request, centralized building/site energy management systems, weather reports, or the like may be a sensor in such a system.

BLE advertising packets can also be used to communicate lighting data. BLE advertising allows communication from many devices to many devices by broadcasting messages on the BLE advertising channels that are received by all devices listening to the BLE advertising channels, whereas when a BLE connection is made, it occurs on one of the connection channels and is an exclusive point to point communication link between two devices. This has important implications for communication of lighting control and status information. When a BLE connection is made between two devices, the connected devices are no longer listening to the BLE advertising channels and thus do not receive any of the advertising packets broadcast by other devices in the space. Since connected devices cannot receive advertising packets, they cannot respond to a command communicated via BLE advertising packets. Similarly, these connected devices cannot communicate data through BLE advertising packets. However, when BLE advertising is employed all commands and data are sent to all devices simultaneously and there is no requirement to sequentially create an exclusive point to point connection with each individual device to send commands or collect data. In one example, device A collects intensity data from LED based illumination device X, device B collects temperature data from the same LED based illumination device X, and device C communicates a lighting control command to LED based illumination device X as well. While these events happen sequentially when looking at the over the air BLE packet traffic, from a user perspective, all of these events appear to happen simultaneously. The events appear simultaneous to a user because they are all handled through BLE advertising packets in which each device broadcasts to all other devices, and, as per the BLE specified advertising protocol, the transmission time for a given BLE advertising packet is only a few milliseconds. When considering an advertising based approach for data collection, the only limitation to the update rate is the advertising interval of a given device. The advertising interval of a device sending commands through advertising is not necessarily a limit as the device will generate the command advertisement based upon an event occurring. In contrast, with the same example using a connection based approach, devices A, B and C need to wait for LED illumination device X to send out an advertisement since, per the BLE protocol, a connection window is only opened up by a device after it advertises. In the connection based approach, once LED illumination device X has completed its advertisement, devices A, B and C may request to make connections to device X, and device X then selects one device (e.g., device A) with which to connect and a connection is established between device A and device X. After the connection is established, device A may collect intensity data from device X and terminate the connection. Devices B and C cannot request a connection to device X until device X sends out another advertising packet after the connection to device A is terminated. Assuming device X then connects with device B, device C cannot connect to device X until after the connection with device B is terminated and device X sends out another advertising packet. Accordingly, when considering the connection based approach for data collection and control, if multiple transactions are desired within a given advertising interval, the transactions will be queued up and handled on a one by one basis, as a separate connection must be established to complete each transaction. Thus, the total time required to complete the transactions in a connection based approach will be a multiple of the target device (i.e., LED illumination device X) advertising interval.

In a further aspect, a gateway collects advertising packets from all of the lights, aggregates the data, and sends the aggregated data to a database on another network (e.g., a backhaul network). In some examples, a mobile electronics device (e.g., a smartphone, tablet computer, etc.) acts as a gateway. In another aspect, the gateway is used to advertise low latency commands (e.g., transition building to a low energy mode).

In general, BLE connections are used for device set-up and configuration, and to collect historic data (e.g., intensity and temperature histograms) from an LED based illumination device. However, for communication of time sensitive lighting control commands and status information, the use of BLE advertising packets can be adapted to provide fast, reliable communication.

In a BLE advertising packet, updated real-time data is sent with every advertising packet. Control packets are repeated at a short advertising interval to mitigate any packet loss. In some embodiments, the novel BLE advertising packets are 31 bytes in length. Each packet includes a 4 byte device ID/address that can be treated as a logical structure. Data from individual lights can be identified by the 4 byte address assigned to that device. Individual lights can be controlled by sending a command that only applies to a specified light, e.g., 0x01020304. A value of 0xFF (255) in any byte value causes that byte to be treated as a broadcast message. For example a group of lights can be controlled by setting a byte to a broadcast value, e.g., 0x010203FF.

Three exemplary BLE advertising packet formats are described herein. Two of the exemplary packet formats are designed to communicate status information associated with the lighting system. One of the exemplary packet formats is designed to communicate lighting control and time sensitive sensor data.

In one example, in the lighting control network 10 depicted in FIG. 1, LED based illumination device 100B broadcasts an advertising packet 142 including data on operating conditions that change in a relatively dynamic manner (e.g., input voltage, operating temperature, etc.). This packet is received by mobile electronics device 140.

As depicted in FIG. 3A, packet 142 includes the following structural elements: 1) Device/Packet Type (byte 7=0x01, byte 8=0x01) indicating the packet is a Type A packet from an LED based illumination device; 2) Device ID (byte 9-12) indicating the 4 byte address assigned to the device; 3) Sequence ID (byte 13) indicating a counter value that used to uniquely identify a packet; 4) Module Intensity (byte 15, byte 16) indicating the current intensity of the LED based illumination device at 0.01% resolution by way of non-limiting example; 5) Module Status (byte 17) indicating an internally monitored status; 6) Module Power (byte 18) indicating module power at 100 milliwatt resolution by way of non-limiting example; 7) Status/Power extension (byte 19) indication high order 2 bits; 8) LED Temperature (byte 20) indicating LED junction temperature in a range between −30 degree C. to 125 degrees C. with 1 degree C. resolution by way of non-limiting example; 9) PCB Temperature (byte 21) indicating the temperature measured on the LED mounting board between −30 degrees C. to 125 degrees C. with 1 degree C. resolution by way of non-limiting example; 10) Input Voltage (byte 22) indicating the average input voltage to the LED driver between 0 and 64 Volts with 250 mV resolution by way of non-limiting example; 11) Input Voltage ripple (byte 23) indicating the ripple on the input voltage to the LED driver between 0 and 12 Volts with 50 mV resolution by way of non-limiting example; 12) Input Voltage Extension (byte 24) indicating a least significant bit extension for input voltage and voltage ripple to increase resolution of these quantities; 13) Reserved for Future Use (bytes 25-29) are filled with zeros and are available for reporting of additional data, enhancing data communication security and integrity, etc.; and 14) Data Protection (byte 30) is employed to provide encryption of the data communicated in advertising packet 142.

In another example, in the lighting control network 10 depicted in FIG. 1, LED based illumination device 100A broadcasts an advertising packet 143 including data on operating conditions that change more slowly (e.g., operating hours, power cycles, etc.). In general, advertising packets of this type are advertised at a slower rate than packets including data that changes more quickly (e.g., packet 142). This packet is received by mobile electronics device 140.

As depicted in FIG. 3B, packet 143 includes the following structural elements: 1) Device/Packet Type (byte 7=0x02, byte 8=0x01) indicating the packet is a Type B packet from an LED based illumination device; 2) Device ID (byte 9-12) indicating the 4 byte address assigned to the device; 3) Sequence ID (byte 13) indicating an incrementing counter value that used to uniquely identify a packet; 4) Module Intensity (byte 15, byte 16) indicating the current intensity of the LED based illumination device at 0.01% resolution by way of non-limiting example; 5) Module Status (byte 17) indicating an internally monitored status; 6) Product ID (bytes 18-20) indicate a unique value that corresponds to a specific Xicato Intelligent Module (XIM) module type; 7) Operating Hours (bytes 21-22) indicating the elapsed hours of operation of the LED based illumination device between 0 and 200,000 hours with 1 hour resolution by way of non-limiting example; 8) Power Cycle count (bytes 23-24) indicating the number of time LED based illumination device has been power cycled between 0 and 500,000 cycles by way of non-limiting example; 9) LED Cycle count (byte 25-26) indicating the number of times the LEDs of an LED based illumination device have been power cycled between 0 and 500,000 cycles by way of non-limiting example; 10) Operations Extension (byte 27) indicating high order bits to extend the range/resolution of Operating Hours, Power Cycle, and LED Cycle data structures; 11) Reserved for Future Use (bytes 28-29) are filled with zeros and are available for reporting of additional data; and 12) Data Protection (byte 30) is employed to provide protection of the data communicated in advertising packet 143.

As discussed hereinbefore, Type B packets may be advertised less often than Type A packets. In one example, the advertising interval for a Type B packet is five times the advertising interval for a Type A packet.

In yet another example, in the lighting control network 10 depicted in FIG. 1, mobile electronics device 140 broadcasts an advertising packet 144 including lighting control command data. Using advertising packets, the advertising rate for each device can drop dramatically (intervals can be greater than two seconds), but command response is nearly instantaneous since the LED based illumination devices can continuously scan for advertised commands. Based on the reduced requirement on packet rate, advertising channel congestion is reduced without delaying the command response. In addition, this approach allow for a more robust transmission of control packets since control packets can be repeated at a short advertising interval to compensate for any control packet loss. This packet is received by LED based illumination device 100.

Figure 3C:
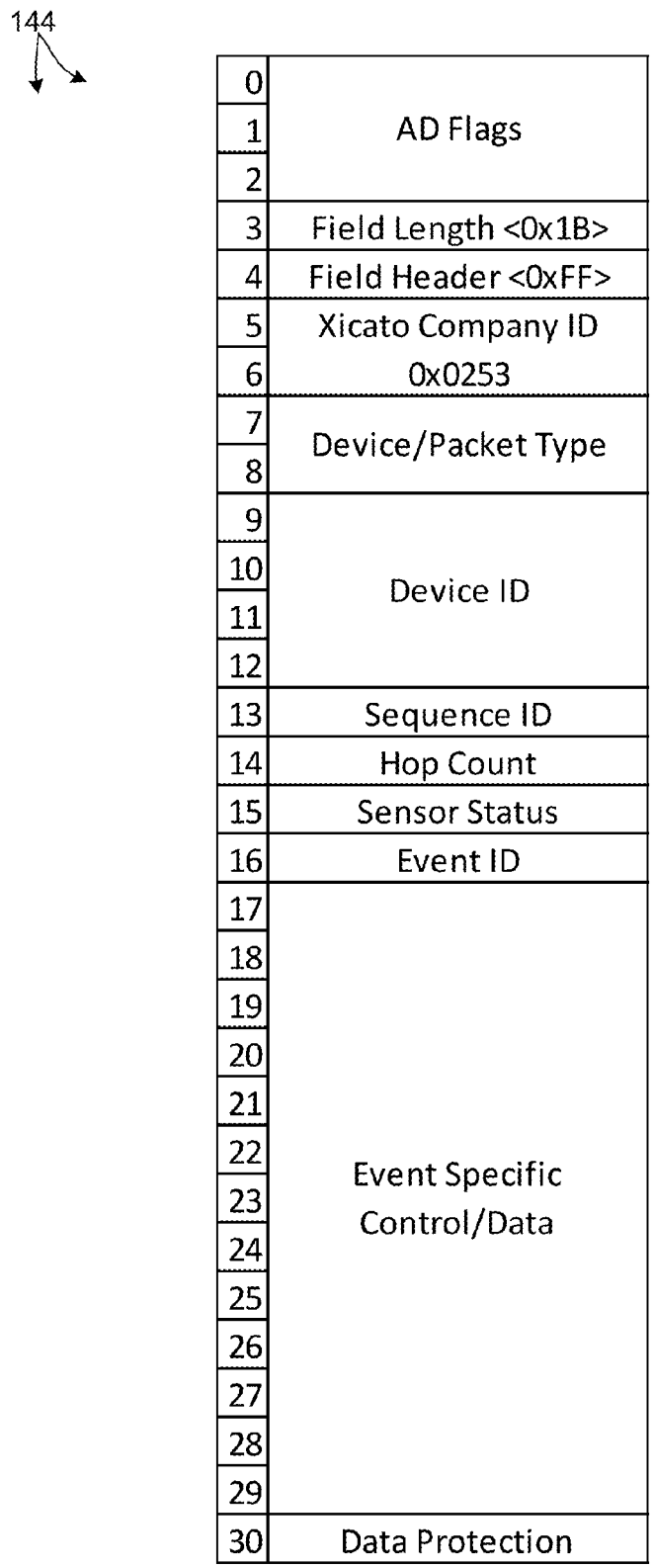
FIG. 3C depicts an example of an advertising packet including lighting control command data that may be broadcast by the mobile electronics device in the lighting control network.

As depicted in FIG. 3C, packet 144 includes the following structural elements: 1) Device/Packet Type (byte 7=0x01, byte 8=0x00) indicating the packet is a control packet from an LED based illumination device; 2) Device ID (byte 9-12) indicating the 4 byte address assigned to the device sending the message; 3) Sequence ID (byte 13) indicating a counter value used to uniquely identify a packet; 4) Sensor Status (byte 15) indicating an internally monitored status; 5) Event ID (byte 16) indicating the type of event (e.g., direct light control) and defines the control/data structure in bytes 17-29; 6) Event specific control/data including, by way of non-limiting example, bytes 17-20 indicating the light control group ID that defines the address of the light or group (by setting a byte to 0xFF) that should respond to the command, bytes 21-22 indicating the commanded intensity at 0.01% resolution, bytes 23-24 indicating the fade time associated with the change to the commanded level, byte 25 indicating the time when the light transition should start, byte 26 indicating command duration (e.g., 0=until new command received, 1-255=duration with 10 s resolution); and 7) Data Protection (byte 30) is employed to provide encryption of the data communicated in advertising packet 144.

In the embodiment depicted in FIG. 2, LCDIM 110 includes an LED driver 121, a power converter 123, a radio frequency transmitter, e.g., in radio frequency transceiver 129, a processor 122, a memory 126, and a timer 127 configured to communicate over bus 128.

Figure 5:
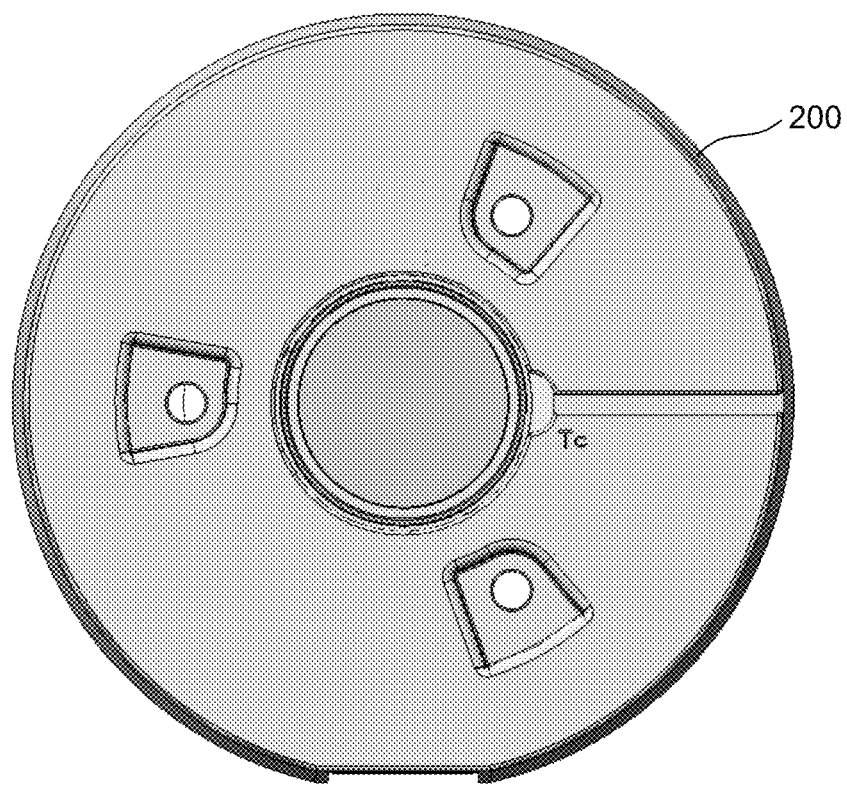
FIGS. 5 and 6 depict a top view and a side view, respectively, of an LED based illumination device including a LCDIM.
Figure 6:
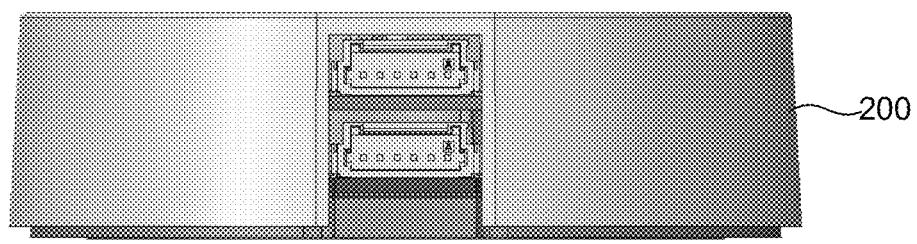

FIGS. 5 and 6 depict a top view and a side view, respectively, of an LED based illumination device 200 including a LCDIM. An example of such a lighting device is the Xicato Intelligent Module (XIM) manufactured by Xicato, Inc., San Jose, Calif. (USA).

Figure 7:
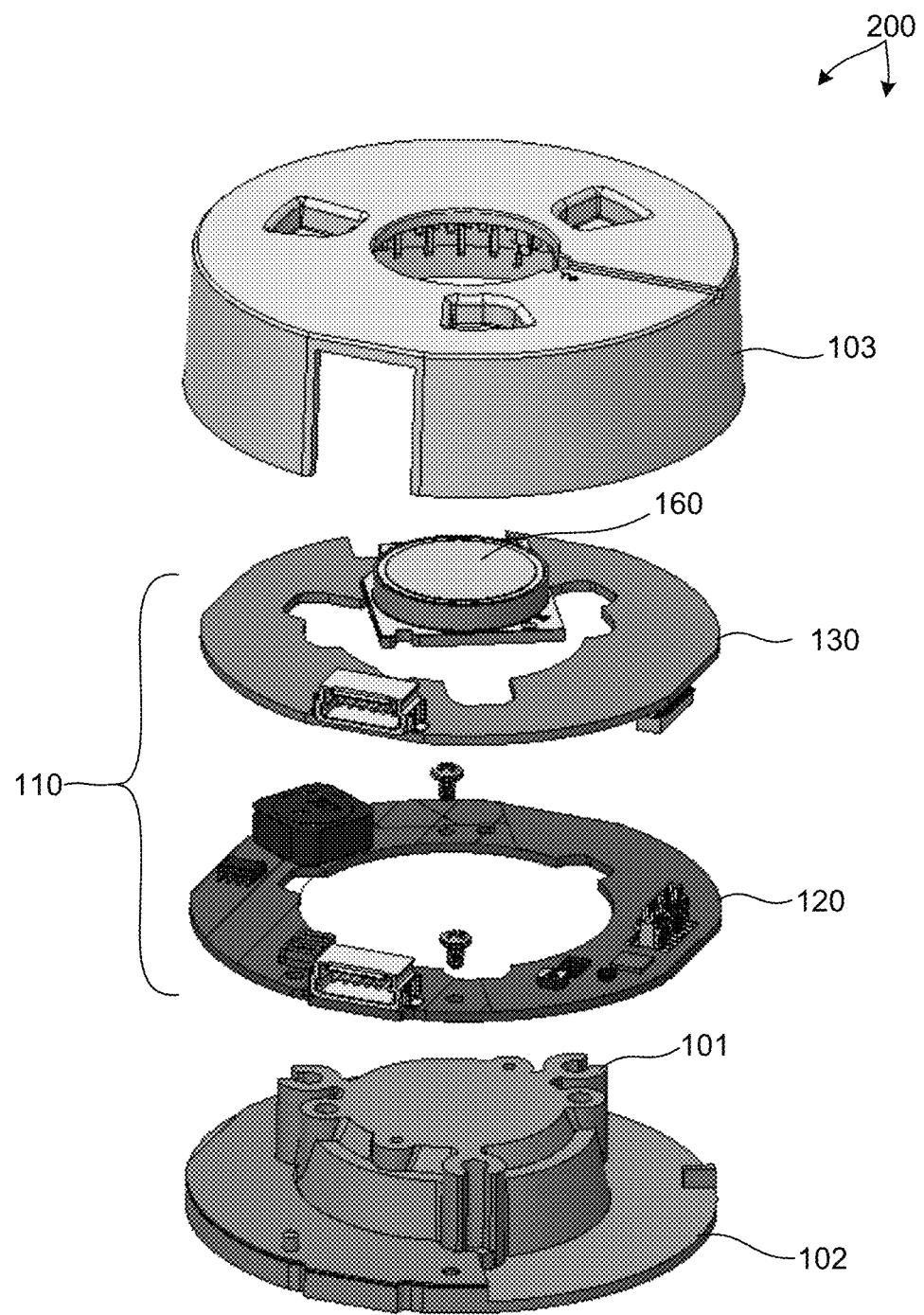
FIG. 7 depicts an exploded view illustrating components of LED based illumination device as depicted in FIG. 2.

FIG. 7 depicts an exploded view illustrating components of LED based illumination device 200 as depicted in FIG. 2. As depicted in FIG. 7, LED based illumination device 200 includes LED based light engine 160, LCDIM 110, including primary ECB 120 and peripheral ECB 130, heat sink 101, mounting plate 102, and housing 103.

The assembled LED based illumination device 200 mechanically integrates the LED based light engine 160 with the LCDIM within a common housing. However, in general, one or more components of LED based illumination device 200 may be mechanically separated from the others. In these embodiments, one or more components may be separately located on a light fixture and electrically coupled to the other components by suitable wiring and connectors. In some embodiments, LED based light engine 160 is assembled within a simple housing to facilitate attachment to a heat sink. An example of such a lighting device is the Xicato Thin Module (XTM) manufactured by Xicato, Inc., San Jose, Calif. (USA). In this example, one or more components of LCDIM 110 are packaged in a separate housing, and this assembly is electrically coupled to the LED based light engine by a wired connection.

It should be understood that as defined herein an LED based illumination device is not an LED, but is an LED light source or fixture or component part of an LED light source or fixture. As depicted in FIGS. 5-7, LED based illumination device 200 includes an LED based light engine 160 configured to generate an amount of light. LED based light engine 160 is coupled to heat sink 101 to promote heat extraction from LED based light engine 160. Primary ECB 120 and peripheral ECB 130 are shaped to fit around heat sink 101. LED based light engine 160, primary ECB 120, peripheral ECB 130, and heat sink 101 are enclosed between mounting plate 102 and housing 103. An optional reflector retainer (not shown) is coupled to housing 103. The reflector retainer is configured to facilitate attachment of different reflectors to the LED based illumination device 200.

In some embodiments, it is advantageous to separate the electronic functionality of LCDIM 110 across two or more electrical circuit boards, as depicted in FIG. 7, to minimize logistical complexity. For example, in a network of LED based illumination devices, certain devices may include different functionality than others. Common functionality is included on the primary ECB associated with each device. In this manner each manufactured device includes the same primary ECB. However, differing functionality is included in a different peripheral ECB. In this manner, one of more different devices may include different peripheral ECBs. Many different configurations may be contemplated. In general, the electronic functionality of LCDIM 110 as described herein may be distributed across any number of components in any suitable manner.

In the embodiment depicted in FIG. 2, LED driver 121 is configured to supply power to one or more LEDs of the LED based light engine 160 over a wired connection 124 between LCDIM 110 and LED based light engine 160. In one embodiment, LED driver 121 is a direct current to direct current (DC/DC) power converter. The DC/DC power converter receives electrical power signals 111 (e.g., 48 Volt supply voltage) supplied to LCDIM 110. The electrical power signals 111 are processed by the DC/DC power converter to generate current signals 125 supplied to the LEDs of LED based light engine 160. In some other embodiments, LED driver 121 is configured as an AC/DC power converter configured to convert AC input power signals to DC current signals supplied to the LEDs of LED based light engine 160. In some other embodiments, LED driver 121 is configured as an AC/AC power converter configured to convert AC input power signals to AC current signals supplied to the LEDs of LED based light engine 160 (e.g., when LED based light engine 160 includes AC LEDs).

In another aspect, LCDIM 110 includes a power converter 123 configured to supply low voltage electrical power signals to the components of LCDIM 110. In this manner, electrical power signals 111 can be used to supply electrical power to LED driver 121 and electrical power to the low voltage components of LCDIM 110 after power conversion by power converter 123. In some embodiments, power converter 123 is a DC/DC power converter that steps down the voltage of electrical power signals 111 to a low voltage range (e.g., less than five volts) suitable for powering the electronic circuitry of LCDIM 110.

LCDIM 110 includes a wireless communications interface to a lighting control network. In some embodiments the wireless communications interface is configured to transmit and receive communications signals 138. The wireless communications interface includes a wireless transmitter and a wireless receiver, e.g., in transceiver 129 operable in accordance with a wireless communications protocol (e.g., BLE), and one or more associated antennas 136 mounted to LED based illumination device 100.

In some embodiments, one or more antennas are mounted to the external facing surface(s) of LED based illumination device 100 to maximize communication efficiency between LED based illumination device 100 and a remotely located communications device (e.g., another LED based illumination device, a sensor module, a mobile phone, a router, or other digital system). In some embodiments, an antenna is integrated into the peripheral ECB 130. In some other embodiments, the antenna is integrated into the primary ECB 120. In some other embodiments, the antenna is integrated into housing 103, for example, by molding the antenna into the housing structure or attaching the antenna to a surface of the housing structure. In some other embodiments, the antenna is integrated into the mounting board of the LED based light engine 160.

As depicted in FIG. 2, LCDIM 110 includes an internal communications bus 128 coupled to various components including processor 122, memory 126, timer 127, power converter 123, transceiver 129, and LED driver 121.

In a further aspect, memory 126 stores identification data, operational data such as temperature history, current history, etc. For example, an identification number, a network security key, commissioning information, etc. may be stored on memory 126.

In some embodiments, communication of lighting control and status information involves a lighting control and communications gateway (LCCG) 40 depicted in FIG. 4. The LCCG 40 may be present on-board an LED based illumination device (e.g., LED based illumination device 100A), or may be arranged separately.

In some examples, LCCG 40 communicates data generated by LED based illumination devices 100A-C, and attached sensors, to a building management system.

In a further aspect, the amount of data communicated between LCCG 40 and building management system 400 is reduced by caching data associated with each LED based illumination device 100A-H on LCCG 40 for ready access by the building management system 400. In this manner, each request for data from the building management system 400 does not require a communication with each individual LED based illumination device to obtain the desired data. In some examples, LCCG 40 is configured to respond to a request for data by the building management system 400 based on cached data stored on LCCG 40 without having to initiate additional communications with other LED based illumination devices (e.g., LED based illumination devices 100A-H.

In some embodiments, any number of parameters associated with one or more LED based illumination devices in lighting control network 10 are communicated to LCCG 40 using the BLE advertising packet structures described herein and stored in a memory of LCCG 40.

By way of non-limiting example, information communicated from each LED based illumination device to LCCG 40 may include any of: a voltage supplied to one or more LEDs of the LED based illumination device, a current supplied to the one or more LEDs of the LED based illumination device, an electrical power consumed by the LED based illumination device, a temperature of the LED based illumination device, a time when the LED based illumination device transitions from an active state to an inactive state, and a time when the LED based illumination device transitions from an inactive state to an active state.

Status information communicated from each LED based illumination device to LCCG 40 is stored in memory 126 of LCCG 40 for several purposes. In one example, the status information is stored for rapid access and response to a request for status information by a building management system 400. For example, LCCG 40 is configured to receive a request for information associated with an LED based illumination device from the building management system 400. LCCG 40 is configured to determine a response to the request based on data stored in the memory of LCCG 40 and transmit the response to the building management system 400. For example, the temperature of LED based illumination device 100B is periodically reported to LCCG 40 over lighting control network 10 and stored in a memory of LCCG 40. At a point in time, a request 43 to report the temperature of LED based illumination device 100B is received by LCCG 40 from building management system 400. In response, LCCG 40 reads out the latest temperature value stored in memory and communicates this value to building management system 400.

In another example, status information stored on LCCG 40 is rapidly communicated to the building management system 400 without specific request. For example, at a point in time LCCG 40 receives a shutdown flag from LED based illumination device 100B followed by an error code. The error code is stored in a memory of LCCG 40. However, in addition, LCCG 40 rapidly communicates the error code to building management system 400 for logging and reporting purposes. By way of non-limiting example, an error code is indicative of any of an operating temperature exceeding a threshold value, an operating voltage exceeding a threshold value, an operating voltage below a threshold value, an operating current exceeding a threshold value, an operating current below a threshold value.

In yet another example, the status information is stored on LCCG 40 for further processing to generate summary status values based on the stored status information. For example, the total amount of time that the LED based illumination device 100B has been in an active state may be computed based on the times between transitions from an inactive state to an active state and transitions from an active state to an inactive state. For example, both shutdown and restart events are reported to LCCG 40 by LED based illumination device 100B over the lighting control network 10. LCCG 40 includes a real time clock 44 and is configured to associate the current time with each of the reported shutdown and restart events and store these times in memory. Thus, the times associated with transitions from an inactive state to an active state and transitions from an active state to an inactive state are stored in a memory of LCCG 40. At a point in time, LCCG 40 receives a request to report the total run time of LED based illumination device 100B from building management system 400. In response, LCCG 40 is configured to compute and report the total amount of time that the LED based illumination device 100B has been in an active state based on the times between transitions from an inactive state to an active state and transitions from an active state to an inactive state that are stored in memory 126.

In a further aspect, LCCG 40 is configured to assign a plurality of internet protocol addresses each associated with a plurality of LED based illumination devices coupled to the lighting control network. In this manner, from the perspective of a device operating on the building management network, each LED based illumination device coupled to the lighting control network appears directly visible and accessible. However, in reality, all requests for information associated with a particular LED based illumination device are received by LCCG 40 and responses to these requests are generated based, either directly or indirectly, on status information cached in memory 126 of LCCG 40.

In another aspect, a real time clock is maintained on LCCG 40 and the date and time are periodically transmitted to each LED based illumination device on the lighting control network. The real time clock is configured to maintain a current date and time of day, and is periodically synchronized with a time server accessible, for example, through the building management system 400. In addition, the current date and time of day maintained by LCCG 40 are periodically communicated to each LED based illumination device on the lighting control network. In particular, the current date and time of day is communicated to a LED based illumination device in response to receiving a message from the LED based illumination device indicating that the LED based illumination device has transitioned from an inactive state to an active state. In other words, when the LED based illumination device transitions from a powered down state, the current date and time of day are reported to the LED based illumination device so that the device can track its operation in real time.

In some examples, each LED based illumination device on the lighting control network reports the time and date associated with a transition from an active state to an inactive state, such as a shutdown event, or an error event to LCCG 40. LCCG 40 stores this time and date in memory. LCCG 40 may report the stored time and date back to each respective LED based illumination device in the lighting control network upon restart or clearing of the error event. In this manner, each LED based illumination device may determine the amount of time it was in an "off" state based on the recalled time and date and the current time and date reported by LCCG 40.

The ability to achieve high speed data communications among LED based illumination devices on the lighting control network including LCCG 40 enables additional, data intensive devices to be added to the LED based illumination devices.

In one example, a LED based illumination device on the lighting control network includes a wireless communications device. In one example, the wireless communications device is a short range radio subsystem that complies with the IEEE 802.15.4 standard. In another example, the wireless communications device is a radio subsystem that complies with the Bluetooth Low Energy standard. The wireless communications device is configured to transmit or receive an amount of data from a device that is external to the lighting control network (e.g., a sensor such as a camera, an occupancy sensor, an environmental sensor, etc.). Data communicated between this device and the LED based illumination device is communicated to LCCG 40, and ultimately to the building management system 400.

FIG. 4 depicts an environment 141 illuminated by LED based illumination devices 100A-H. In addition, LED based illumination device 100A includes a LCCG 40 to bridge communications between a lighting control network and a building management network. The lighting control network includes LED based illumination devices 100A-H and mobile electronics device 140. The building management network includes LED based illumination device 100A and building management system 400. Mobile electronics device 140 (e.g., mobile phone, tablet computer, etc.) includes a camera module and associated software to identify the presence of LED based illumination devices 100A-H including LCCG 40 within environment 141.

In one example, it may be desirable to group LED based illumination devices 100A-H and control the light emitted from the LED based illumination device 100A-H based on triggering events.

In one aspect, mobile electronics device 140 is configured to generate and communicate instructions to LED based illumination devices 100A-H that defines light control rules that govern the response of each of the LED based illumination devices 100A-H.

As depicted in FIG. 1, mobile electronics device 140 broadcasts signal 144. In some embodiments, signal 144 also includes an indication of the identities of each of the LED based illumination devices participating in the group (e.g., LED based illumination devices 100A-H), and at least one lighting control rule. The lighting control rule includes at least one parameter that defines at least a portion of the light control response of each LED based illumination device. By way of non-limiting example, a parameter defining at least a portion of the light control response may include any of a fade-on rate, a target intensity level, a persistence time, and a fade-off rate.

Signal 144 may not directly reach all of the LED based lighting control devices. In these examples, some LED based illumination devices that receive signal 144 rebroadcast signal 144. In this manner, all LED based illumination devices in a group receive the programming information contained in signal 144.

Each of the LED based illumination devices compare their own identities (e.g., physical address, logical address, etc.) with the target identities included in signal 144. If there is match, the LED based illumination device writes the sensor identity and light control rule(s) to their respective memories (e.g., memory 126 depicted in FIG. 2). In this manner, each LED based illumination device is configured to respond to control communications and respond in accordance with the programmed light control rules. In this manner, a mobile communication device may be employed to flexibly program groups of LED based illumination devices to respond in a synchronized manner.

Although programming information may be communicated to one or more LED based illumination devices by a mobile electronic device, in general, any suitable electronic device (e.g., building management server, networked computer, etc.) may be employed to communicate programming information.

Figure 8:
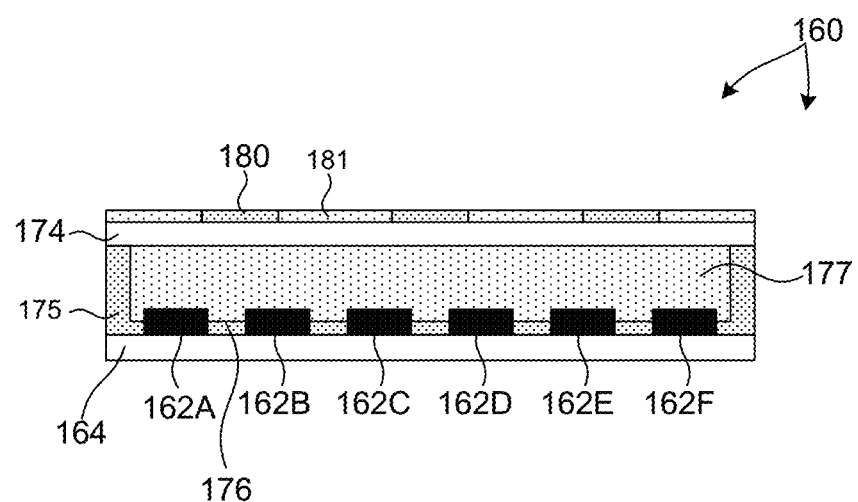
FIG. 8 illustrates a cross-sectional view of an LED based light engine.

FIG. 8 is illustrative of LED based light engine 160 in one embodiment. LED based light engine 160 includes one or more LED die or packaged LEDs and a mounting board to which LED die or packaged LEDs are attached. In addition, LED based light engine 160 includes one or more transmissive elements (e.g., windows or sidewalls) coated or impregnated with one or more wavelength converting materials to achieve light emission at a desired color point.

As illustrated in FIG. 8, LED based light engine 160 includes a number of LEDs 162A-F mounted to mounting board 164 in a chip on board (COB) configuration. The spaces between each LED are filled with a reflective material 176 (e.g., a white silicone material). In addition, a dam of reflective material 175 surrounds the LEDs 162 and supports transmissive element 174, sometimes referred to as a transmissive plate. The space between LEDs 162 and transmissive element 174 is filled with an encapsulating optically translucent material 177 (e.g., silicone) to promote light extraction from LEDs 162 and to separate LEDs 162 from the environment. In the depicted embodiment, the dam of reflective material 175 is both the thermally conductive structure that conducts heat from transmissive plate 174 to LED mounting board 164 and the optically reflective structure that reflects incident light from LEDs 162 toward transmissive plate 174.

LEDs 162 can emit different or the same colors, either by direct emission or by phosphor conversion, e.g., where phosphor layers are applied to the LEDs as part of the LED package. The illumination device 100 may use any combination of colored LEDs 162, such as red, green, blue, ultraviolet, amber, or cyan, or the LEDs 162 may all produce the same color light. Some or all of the LEDs 162 may produce white light. In addition, the LEDs 162 may emit polarized light or non-polarized light and LED based illumination device 100 may use any combination of polarized or non-polarized LEDs. In some embodiments, LEDs 162 emit either blue or UV light because of the efficiency of LEDs emitting in these wavelength ranges. The light emitted from the illumination device 100 has a desired color when LEDs 162 are used in combination with wavelength converting materials on transmissive plate 174, for example. By tuning the chemical and/or physical (such as thickness and concentration) properties of the wavelength converting materials and the geometric properties of the coatings on the surface of transmissive plate 174, specific color properties of light output by LED based illumination device 100 may be specified, e.g., color point, color temperature, and color rendering index (CRI).

For purposes of this patent document, a wavelength converting material is any single chemical compound or mixture of different chemical compounds that performs a color conversion function, e.g., absorbs an amount of light of one peak wavelength, and in response, emits an amount of light at another peak wavelength.

By way of example, phosphors may be chosen from the set denoted by the following chemical formulas: $Y_3Al_5O_{12}$:Ce, (also known as YAG:Ce, or simply YAG) $(Y,Gd)_3Al_5O_{12}$:Ce, CaS:Eu, SrS:Eu, $SrGa_2S_4$:Eu, $Ca_3(Sc,Mg)_2Si_3O_{12}$:Ce, $Ca_3Sc_2Si_3O_{12}$:Ce, $Ca_3Sc_2O_4$:Ce, $Ba_3Si_6O_{12}N_2$:Eu, (Sr,Ca)AlSiN_3:Eu, CaAlSiN_3:Eu, CaAlSi(ON)_3:Eu, $Ba_2SiO_4$:Eu, $Sr_2SiO_4$:Eu, $Ca_2SiO_4$:Eu, $CaSc_2O_4$:Ce, $CaSi_2O_2N_2$:Eu, $SrSi_2O_2N_2$:Eu, $BaSi_2O_2N_2$:Eu, $Ca_5(PO_4)_3Cl$:Eu, $Ba_5(PO_4)_3Cl$:Eu, $Cs_2CaP_2O_7$, $Cs_2SrP_2O_7$, $Lu_3Al_5O_{12}$:Ce, $Ca_8Mg(SiO_4)_4Cl_2$:Eu, $Sr_8Mg(SiO_4)_4Cl_2$:Eu, $La_3Si_6N_{11}$:Ce, $Y_3Ga_5O_{12}$:Ce, $Gd_3Ga_5O_{12}$:Ce, $Tb_3Al_5O_{12}$:Ce, $Tb_3Ga_5O_{12}$:Ce, and $Lu_3Ga_5O_{12}$:Ce.

In one example, the adjustment of color point of the illumination device may be accomplished by adding or removing wavelength converting material from transmissive plate 174. In one embodiment a red emitting phosphor 181 such as an alkaline earth oxy silicon nitride covers a portion of transmissive plate 174, and a yellow emitting phosphor 180 such as a YAG phosphor covers another portion of transmissive plate 174.

In some embodiments, the phosphors are mixed in a suitable solvent medium with a binder and, optionally, a surfactant and a plasticizer. The resulting mixture is deposited by any of spraying, screen printing, blade coating, jetting, or other suitable means. By choosing the shape and height of the transmissive plate 174, and selecting which portions of transmissive plate 174 will be covered with a particular phosphor or not, and by optimization of the layer thickness and concentration of a phosphor layer on the surfaces, the color point of the light emitted from the device can be tuned as desired.

In one example, a single type of wavelength converting material may be patterned on a portion of transmissive plate 174. By way of example, a red emitting phosphor 181 may be patterned on different areas of the transmissive plate 174 and a yellow emitting phosphor 180 may be patterned on other areas of transmissive plate 174. In some examples, the areas may be physically separated from one another. In some other examples, the areas may be adjacent to one another. The coverage and/or concentrations of the phosphors may be varied to produce different color temperatures. It should be understood that the coverage area of the red and/or the concentrations of the red and yellow phosphors will need to vary to produce the desired color temperatures if the light produced by the LEDs 162 varies. The color performance of the LEDs 162, red phosphor and the yellow phosphor may be measured and modified by any of adding or removing phosphor material based on performance so that the final assembled product produces the desired color temperature.

Transmissive plate 174 may be constructed from a suitable optically transmissive material (e.g., sapphire, quartz, alumina, crown glass, polycarbonate, and other plastics). Transmissive plate 174 is spaced above the light emitting surface of LEDs 162 by a clearance distance. In some embodiments, this is desirable to allow clearance for wire bond connections from the LED package submount to the active area of the LED. In some embodiments, a clearance of one millimeter or less is desirable to allow clearance for wire bond connections. In some other embodiments, a clearance of two hundred microns or less is desirable to enhance light extraction from the LEDs 162.

In some other embodiments, the clearance distance may be determined by the size of the LED 162. For example, the size of the LED 162 may be characterized by the length dimension of any side of a single, square shaped active die area. In some other examples, the size of the LED 162 may be characterized by the length dimension of any side of a rectangular shaped active die area. Some LEDs 162 include many active die areas (e.g., LED arrays). In these examples, the size of the LED 162 may be characterized by either the size of any individual die or by the size of the entire array. In some embodiments, the clearance should be less than the size of the LED 162. In some embodiments, the clearance should be less than twenty percent of the size of the LED 162. In some embodiments, the clearance should be less than five percent of the size of the LED. As the clearance is reduced, light extraction efficiency may be improved, but output beam uniformity may also degrade.

In some other embodiments, it is desirable to attach transmissive plate 174 directly to the surface of the LED 162. In this manner, the direct thermal contact between transmissive plate 174 and LEDs 162 promotes heat dissipation from LEDs 162. In some other embodiments, the space between mounting board 164 and transmissive plate 174 may be filled with a solid encapsulate material. By way of example, silicone may be used to fill the space. In some other embodiments, the space may be filled with a fluid to promote heat extraction from LEDs 162.

In the embodiment illustrated in FIG. 5, the surface of patterned transmissive plate 174 facing LEDs 162 is coupled to LEDs 162 by an amount of flexible, optically translucent material 177. By way of non-limiting example, the flexible, optically translucent material 177 may include an adhesive, an optically clear silicone, a silicone loaded with reflective particles (e.g., titanium dioxide ($TiO_2$), zinc oxide (ZnO), and barium sulfate ($BaSO_4$) particles, or a combination of these materials), a silicone loaded with a wavelength converting material (e.g., phosphor particles), a sintered PTFE material, etc. Such material may be applied to couple transmissive plate 174 to LEDs 162 in any of the embodiments described herein.

In some embodiments, multiple, stacked transmissive layers are employed. Each transmissive layer includes different wavelength converting materials. For example, a transmissive layer including a wavelength converting material may be placed over another transmissive layer including a different wavelength converting material. In this manner, the color point of light emitted from LED based illumination device 100 may be tuned by replacing the different transmissive layers independently to achieve a desired color point. In some embodiments, the different transmissive layers may be placed in contact with each other to promote light extraction. In some other embodiments, the different transmissive layers may be separated by a distance to promote cooling of the transmissive layers. For example, airflow may by introduced through the space to cool the transmissive layers.

The mounting board 164 provides electrical connections to the attached LEDs 162 to a power supply (not shown). In one embodiment, the LEDs 162 are packaged LEDs, such as the Luxeon Rebel manufactured by Philips Lumileds Lighting. Other types of packaged LEDs may also be used, such as those manufactured by OSRAM (Ostar package), Luminus Devices (USA), Cree (USA), Nichia (Japan), or Tridonic (Austria). As defined herein, a packaged LED is an assembly of one or more LED die that contains electrical connections, such as wire bond connections or stud bumps, and possibly includes an optical element and thermal, mechanical, and electrical interfaces. The LEDs 162 may include a lens over the LED chips. Alternatively, LEDs without a lens may be used. LEDs without lenses may include protective layers, which may include phosphors. The phosphors can be applied as a dispersion in a binder, or applied as a separate plate. Each LED 162 includes at least one LED chip or die, which may be mounted on a submount. The LED chip typically has a size about 1 mm by 1 mm by 0.5 mm, but these dimensions may vary. In some embodiments, the LEDs 162 may include multiple chips. The multiple chips can emit light similar or different colors, e.g., red, green, and blue. The LEDs 162 may emit polarized light or non-polarized light and LED based illumination device 100 may use any combination of polarized or non-polarized LEDs. In some embodiments, LEDs 162 emit either blue or UV light because of the efficiency of LEDs emitting in these wavelength ranges. In addition, different phosphor layers may be applied on different chips on the same submount. The submount may be ceramic or other appropriate material. The submount typically includes electrical contact pads on a bottom surface that are coupled to contacts on the mounting board 164. Alternatively, electrical bond wires may be used to electrically connect the chips to a mounting board. Along with electrical contact pads, the LEDs 162 may include thermal contact areas on the bottom surface of the submount through which heat generated by the LED chips can be extracted. The thermal contact areas are coupled to heat spreading layers on the mounting board 164. Heat spreading layers may be disposed on any of the top, bottom, or intermediate layers of mounting board 164. Heat spreading layers may be connected by vias that connect any of the top, bottom, and intermediate heat spreading layers.

In some embodiments, the mounting board 164 conducts heat generated by the LEDs 162 to the sides of the board 164 and the bottom of the board 164. In one example, the bottom of mounting board 164 may be thermally coupled to a heat sink, or a lighting fixture and/or other mechanisms to dissipate the heat, such as a fan. In some embodiments, the mounting board 164 conducts heat to a heat sink thermally coupled to the top of the board 164. Mounting board 164 may be an FR4 board, e.g., that is 0.5 mm thick, with relatively thick copper layers, e.g., 30 micrometers to 100 micrometers, on the top and bottom surfaces that serve as thermal contact areas. In other examples, the board 164 may be a metal core printed circuit board (PCB) or a ceramic submount with appropriate electrical connections. Other types of boards may be used, such as those made of alumina (aluminum oxide in ceramic form), or aluminum nitride (also in ceramic form).

Mounting board 164 includes electrical pads to which the electrical pads on the LEDs 162 are connected. The electrical pads are electrically connected by a metal, e.g., copper, trace to a contact, to which a wire, bridge or other external electrical source is connected. In some embodiments, the electrical pads may be vias through the board 164 and the electrical connection is made on the opposite side, i.e., the bottom, of the board. Mounting board 164, as illustrated, is rectangular in dimension. LEDs 162 mounted to mounting board 164 may be arranged in different configurations on rectangular mounting board 164. In one example LEDs 162 are aligned in rows extending in the length dimension and in columns extending in the width dimension of mounting board 164. In another example, LEDs 162 are arranged in a hexagonally closely packed structure. In such an arrangement each LED is equidistant from each of its immediate neighbors. Such an arrangement is desirable to increase the uniformity and efficiency of emitted light.

Figure 9:
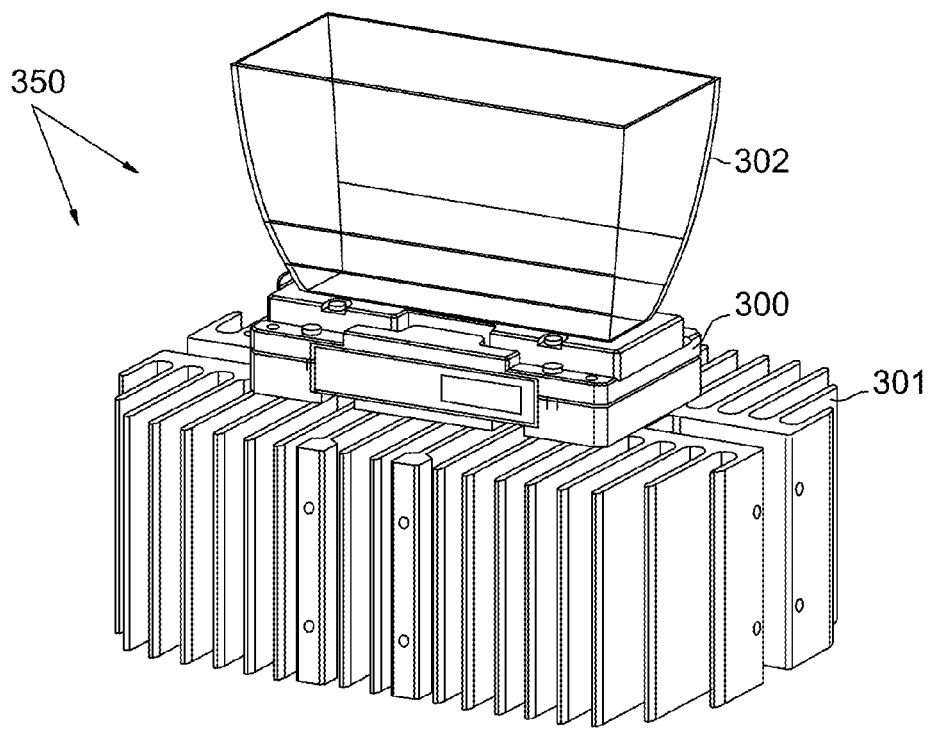
FIG. 9 depicts a perspective view of a luminaire including an LED based illumination device with a rectangular form factor.
Figure 10:
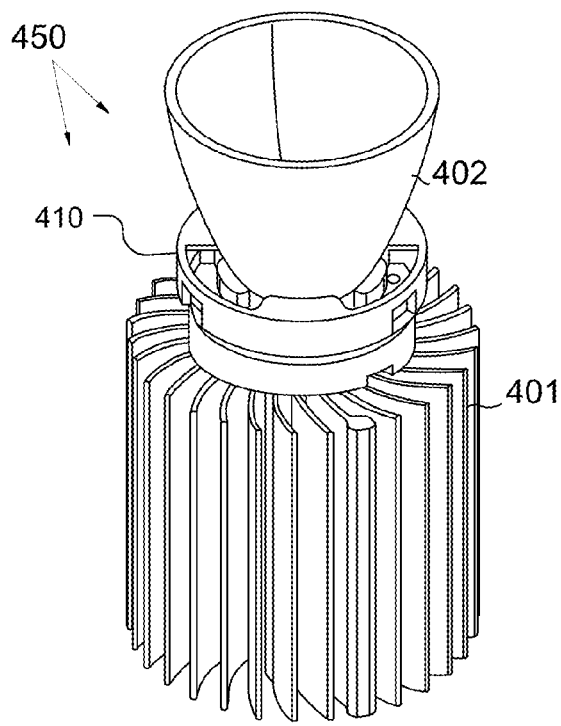
FIG. 10 depicts a perspective view of a luminaire including an LED based illumination device with a circular form factor.
Figure 11:
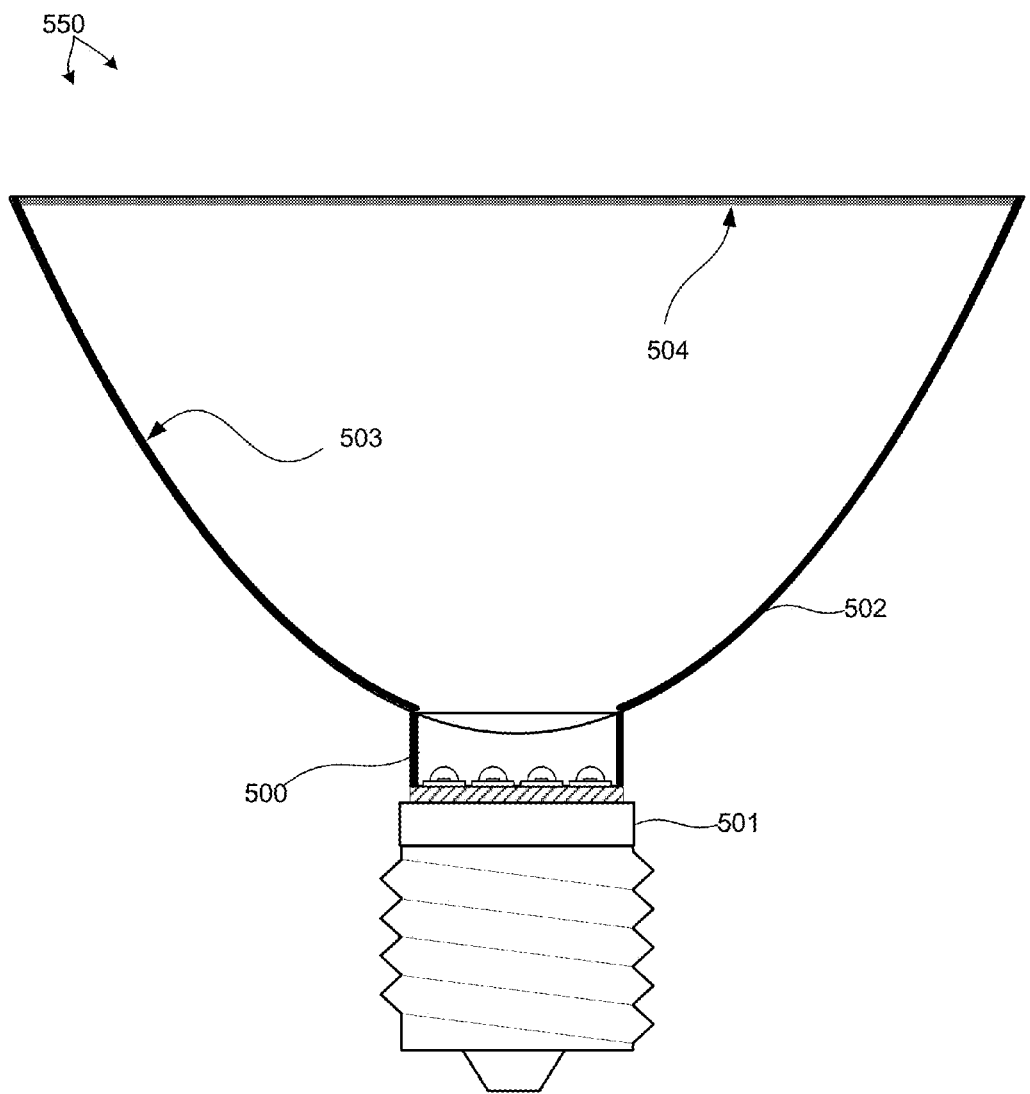
FIG. 11 depicts a side view of a luminaire including an LED based illumination device integrated into a retrofit lamp device.

FIGS. 9, 10, and 11 illustrate three exemplary luminaires. Luminaire 350 illustrated in FIG. 9 includes an illumination module 300 with a rectangular form factor. The luminaire 450 illustrated in FIG. 10 includes an illumination module 410 with a circular form factor. The luminaire 550 illustrated in FIG. 11 includes an illumination module 500 integrated into a retrofit lamp device. These examples are for illustrative purposes. Examples of illumination modules of general polygonal and elliptical shapes may also be contemplated.

Luminaires 350, 450, and 550 include illumination modules 300, 410, and 500, reflectors 302, 402, and 502, and light fixtures 301, 401, and 501, respectively. As depicted, the light fixtures include a heat sink capability, and therefore may be sometimes referred to as a heat sink. However, the light fixtures may include other structural and decorative elements (not shown). The reflectors are mounted to the illumination modules to collimate or deflect light emitted from each illumination module. Reflectors may be made from a thermally conductive material, such as a material that includes aluminum or copper and may be thermally coupled to each illumination module. Heat flows by conduction through the illumination module and the thermally conductive reflector. Heat also flows via thermal convection over the reflector. Reflectors may be compound parabolic concentrators, where the concentrator is constructed of or coated with a highly reflecting material. Optical elements, such as a diffuser or reflector may be removably coupled to an illumination module, e.g., by means of threads, a clamp, a twist-lock mechanism, or other appropriate arrangement. As illustrated in FIG. 11, the reflector 502 may include sidewalls 503 and a window 504 that are optionally coated, e.g., with a wavelength converting material, diffusing material or any other desired material.

As depicted in FIGS. 9, 10, and 11, the illumination module is mounted to a heat sink. The heat sink may be made from a thermally conductive material, such as a material that includes aluminum or copper and may be thermally coupled to an illumination module. Heat flows by conduction through an illumination module and the thermally conductive heat sink. Heat also flows via thermal convection over the heat sink. Each illumination module may be attached to a heat sink by way of screw threads to clamp the illumination module to the heat sink. To facilitate easy removal and replacement, the illumination module may be removably coupled to the heat sink, e.g., by means of a clamp mechanism, a twist-lock mechanism, or other appropriate arrangement. The illumination module includes at least one thermally conductive surface that is thermally coupled to the heat sink, e.g., directly or using thermal grease, thermal tape, thermal pads, or thermal epoxy. For adequate cooling of the LEDs, a thermal contact area of at least 50 square millimeters, but preferably 100 square millimeters should be used per one watt of electrical energy flow into the LEDs on the board. For example, in the case when 20 LEDs are used, a 1000 to 2000 square millimeter heatsink contact area should be used. Using a larger heat sink may permit the LEDs to be driven at higher power, and also allows for different heat sink designs. For example, some designs may exhibit a cooling capacity that is less dependent on the orientation of the heat sink. In addition, fans or other solutions for forced cooling may be used to remove the heat from the device. The bottom heat sink may include an aperture so that electrical connections can be made to the illumination module.

Although certain specific embodiments are described above for instructional purposes, the teachings of this patent document have general applicability and are not limited to the specific embodiments described above. For example, it is understood that the Bluetooth Smart protocol and the Bluetooth Low Energy protocol are sometimes referred to interchangeably in common industry parlance, and their usage as described herein is provided by way of non-limiting example, as many other wireless communication protocols may be contemplated within the scope of this patent document. Accordingly, various modifications, adaptations, and combinations of various features of the described embodiments can be practiced without departing from the scope of the invention as set forth in the claims.

What is claimed is:

1. A Light Control and Data Interface Module (LCDIM) comprising:
    an LED driver configured to supply electrical power to an LED based light engine that is electrically coupled to the LCDIM;
    a radio frequency transmitter configured to communicate a signal indicative of an operational status of the LED driver, the LED based light engine, or both, to an electronic device communicatively linked to the LCDIM on a wireless communications network operating in compliance with a Bluetooth Low Energy (BLE) protocol, wherein the communicating of the signal involves a first BLE advertising packet that includes the signal indicative of the operational status of the LED driver, the LED based light engine, or both; and
    a radio frequency receiver configured to receive a signal indicative of a lighting control command from a light control device, wherein the light control device and the LCDIM are communicatively linked on the wireless communications network operating in compliance with the Bluetooth Low Energy (BLE) protocol, wherein the receiving of the signal involves a second BLE advertising packet that includes the signal indicative of the lighting control command;
    wherein the first BLE advertising packet is communicated to the electronic device and the second BLE advertising packet is received by the LCDIM without generating an exclusive point to point communication link between the LCDIM and the electronic device or the light control device.

2. The LCDIM of claim 1, wherein the signal indicative of the operational status of the LED driver, the LED based light engine, or both, includes real time data.

3. The LCDIM of claim 2, wherein the real time data includes any of an indication of an intensity of light emitted from the LED based light engine, a status of the LED driver, the LED based light engine, or both, an amount of electrical power consumed by the LED based light engine, a junction temperature of one or more LEDs of the LED light engine, a temperature of an LED mounting board of the LED based light engine, an input voltage supplied to the LED driver, and an input voltage ripple supplied to the LED driver.

4. The LCDIM of claim 1, wherein the signal indicative of the operational status of the LED based light engine includes any of an indication of a device identifier, a cumulative number of operating hours, a power cycle count, and an LED cycle count.

5. The LCDIM of claim 1, wherein the electronic device communicatively linked to the LCDIM on the wireless communications network is a mobile communications device.

6. The LCDIM of claim 1, wherein the electronic device communicatively linked to the LCDIM on the wireless communications network is a communications gateway configured to aggregate data received from the LCDIM and communicate the aggregated data to another electronic device communicatively linked to the gateway on another communications network.

7. The LCDIM of claim 1, wherein the electronic device is the light control device.

8. A lighting control system comprising:
    a Light Control and Data Interface Module (LCDIM) comprising an LED driver configured to supply electrical power to an LED based light engine that is electrically coupled to the LCDIM; and
    a light control device comprising a radio frequency transmitter configured to communicate a signal indicative of a lighting control command to the LCDIM, wherein the light control device and the LCDIM are communicatively linked on a wireless communications network operating in compliance with a Bluetooth Low Energy (BLE) protocol, wherein the communicating of the signal involves a first BLE advertising packet that includes the signal indicative of the lighting control command, and further comprising a radio frequency receiver configured to receive a signal indicative of an operational status of the LED driver, the LED based light engine, or both from the LCDIM, wherein the receiving of the signal involves a second BLE advertising packet that includes the signal indicative of the operational status of the LED driver, the LED based light engine, or both, wherein the first BLE advertising packet is communicated to the LCDIM and the second BLE advertising packet is received by the light control device without generating an exclusive point to point communication link between the LCDIM and the light control device.

9. The lighting control system of claim 8, wherein the lighting control device is a mobile communications device.

10. The lighting control system of claim 8, wherein the lighting control device is a sensor, including any of a user operated switch, a motion sensor, an optical tripwire, an accelerometer, and a proximity sensor, and wherein the lighting control command includes an indication of a change of state an environment surrounding the sensor.

11. The lighting control system of claim 8, wherein the first BLE advertising packet that includes the signal indicative of the lighting control command also includes a device identifier that indicates that the first BLE advertising packet is targeted to a single LCDIM.

12. The lighting control system of claim 8, wherein the first BLE advertising packet that includes the signal indicative of the lighting control command also includes a group identifier that indicates that the first BLE advertising packet is targeted to a group of LCDIMs.

13. The lighting control system of claim 8, wherein the lighting control command includes any of a commanded intensity, a fade time, an initiation time of a light transition, and a command duration.

14. An LED based illumination device, comprising:
   an LED based light engine configured to generate an amount of illumination light; and
   a Light Control and Data Interface Module (LCDIM) electrically coupled to the LED based light engine, the LCDIM including an LED driver configured to supply electrical power to the LED based light engine and a radio frequency transmitter configured to communicate a signal indicative of an operational status of the LED driver, the LED based light engine, or both, to an electronic device communicatively linked to the LCDIM on a wireless communications network operating in compliance with a Bluetooth Low Energy (BLE) protocol, wherein the communicating of the signal involves a first BLE advertising packet that includes the signal indicative of the operational status of the LED driver, the LED based light engine, or both, and a radio frequency receiver further configured to receive a signal indicative of a lighting control command from a light control device, wherein the light control device and the LCDIM are communicatively linked on the wireless communications network operating in compliance with the Bluetooth Low Energy (BLE) protocol, wherein the receiving of the signal involves a second BLE advertising packet that includes the signal indicative of the lighting control command; wherein the first BLE advertising packet is communicated to the electronic device and the second BLE advertising packet is received by the LCDIM without generating an exclusive point to point communication link between the LCDIM and the electronic device or the light control device.

15. The LED based illumination device of claim 14, wherein the first and second BLE advertising packets are unacknowledged, broadcast messages.

16. The LED based illumination device of claim 14, wherein the lighting control device is a mobile communications device.

17. The LED based illumination device of claim 14, wherein the lighting control device is any of a user operated switch, a motion sensor, an optical tripwire, an accelerometer, and a proximity sensor.

18. The LED based illumination device of claim 14, wherein the electronic device is the light control device.

* * * * *